Figure 1:
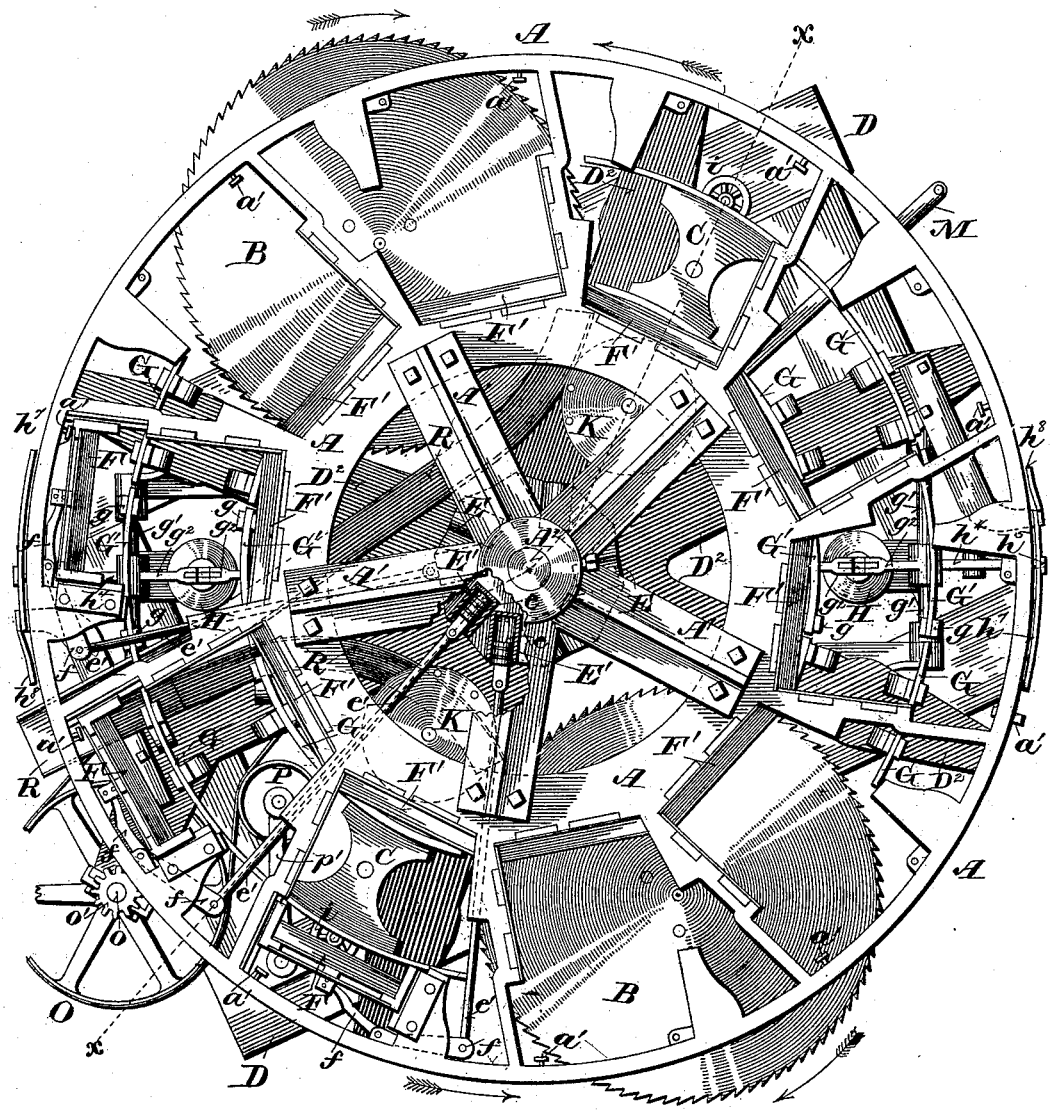

(No Model.) F. CHALLONER. 6 Sheets—Sheet 1.
SHINGLE SAWING MACHINE.

No. 409,011. Patented Aug. 13, 1889.

Witnesses: Chas. L. Goss E. G. Asmus

Inventor: Frank Challoner, By Flanders & Bottum Attorneys.

(No Model.) 6 Sheets—Sheet 2.
F. CHALLONER.
SHINGLE SAWING MACHINE.
No. 409,011. Patented Aug. 13, 1889.
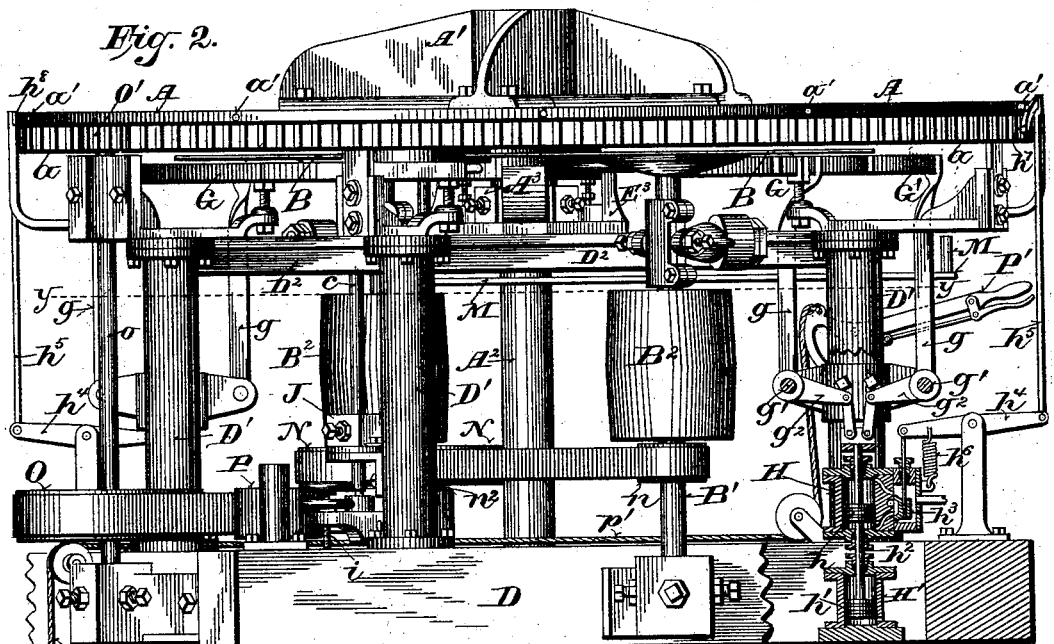
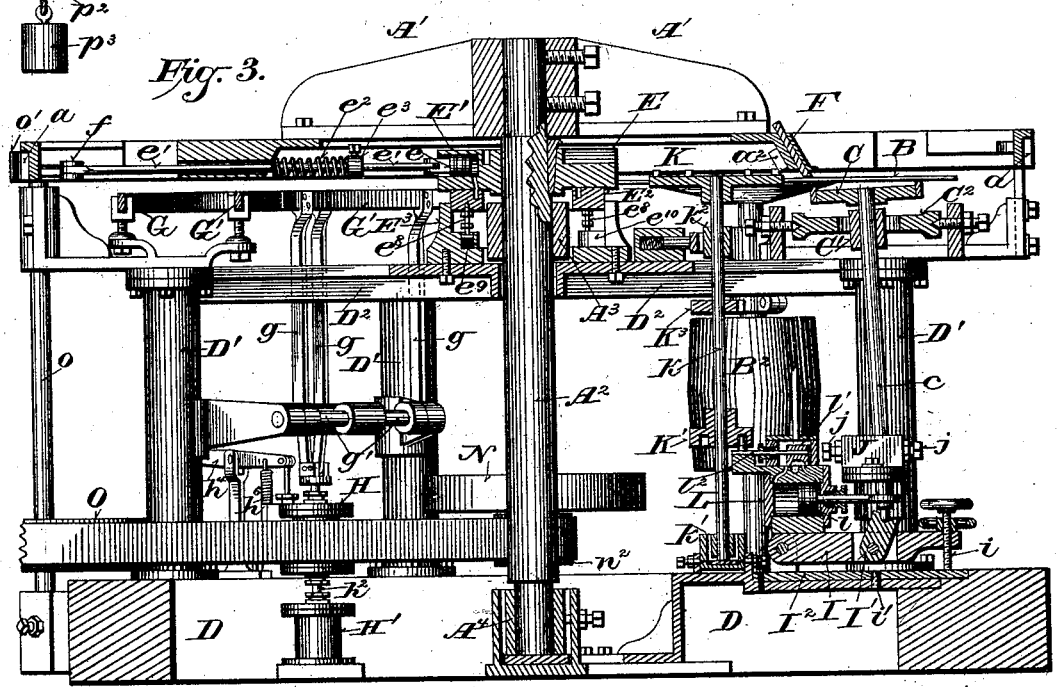
Witnesses:
Chas. L. Goss.
Inventor:
Frank Challoner
By Flanders & Bottum
Attorneys.

(No Model.)  6 Sheets—Sheet 3.

F. CHALLONER.
SHINGLE SAWING MACHINE.

No. 409,011. Patented Aug. 13, 1889.

Witnesses:
Chas. L. Goss.
C. G. Asmus

Inventor:
Frank Challoner
By Flanders & Bottum
Attorneys.

N. PETERS, Photo-Lithographer, Washington, D. C.

(No Model.) 6 Sheets—Sheet 4.

F. CHALLONER.
SHINGLE SAWING-MACHINE.

No. 409,011. Patented Aug. 13, 1889.

Witnesses:
Chas. L. Goss.
C. C. Amus.

Inventor:
Frank Challoner
By Flanders & Bottum
Attorneys.

(No Model.) 6 Sheets—Sheet 5.

F. CHALLONER.
SHINGLE SAWING MACHINE.

No. 409,011. Patented Aug. 13, 1889.

Witnesses:
Chas. L. Goss.
E. G. Asmus

Inventor:
Frank Challoner,
By Flanders & Bottum
Attorneys.

(No Model.) 6 Sheets—Sheet 6.

F. CHALLONER.
SHINGLE SAWING MACHINE.

No. 409,011. Patented Aug. 13, 1889.

Witnesses:
Chas. L. Goss
C. G. Somus

Inventor:
Frank Challoner,
By Flanders & Bottum
Attorneys.

UNITED STATES PATENT OFFICE.

FRANK CHALLONER, OF OMRO, WISCONSIN.

SHINGLE-SAWING MACHINE.

SPECIFICATION forming part of Letters Patent No. 409,011, dated August 13, 1889.

Application filed April 30, 1888. Serial No. 272,267. (No model.)

*To all whom it may concern:*

Be it known that I, FRANK CHALLONER, of Omro, in the county of Winnebago and State of Wisconsin, have invented certain new and useful Improvements in Shingle-Sawing Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to apply steam to the operation of the dogs for holding the bolts, to the operation of the spalt-dropping mechanism, and to the operation of the tilting tables, to facilitate the shifting of the tilting table for "graining" the shingle-bolts, &c.

It consists, essentially, of a piston connected with the movable dog of each bolt-carrying receptacle, of an automatic valve controlling the movement of said piston, of a piston connected with the movable section or sections of the bolt-supporting ways, of mechanism under the control of the operator operating the valve controlling the movement of said piston, of a piston connected with each tilting table and arranged to reverse the inclination of the same, of valve-actuating mechanism controlling the movement of said piston, of mechanism for automatically returning each tilting table to its normal inclination, and of certain other novel features, hereinafter specifically set forth, and pointed out in the claims.

In the accompanying drawings like letters designate the same parts in the several figures.

Figure 4:
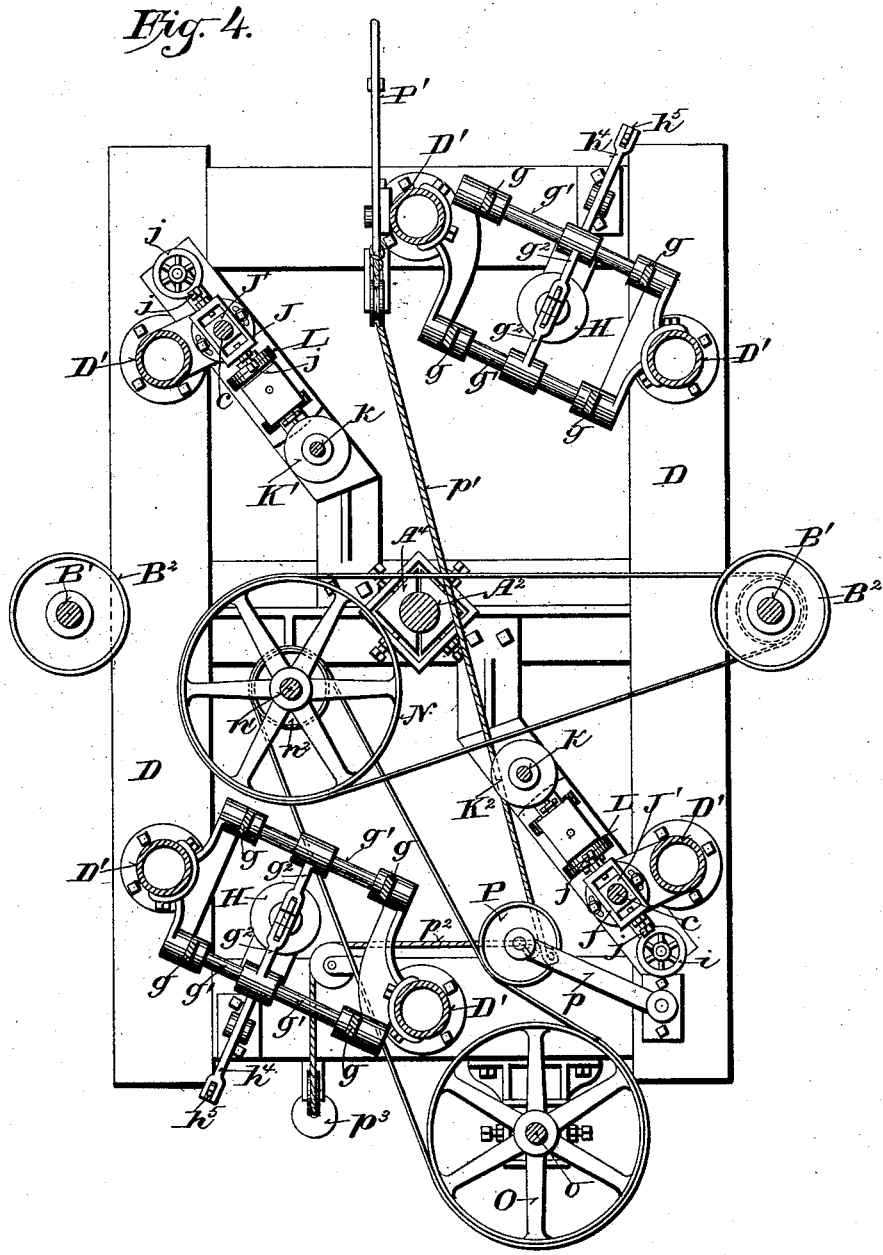
Figure 9:
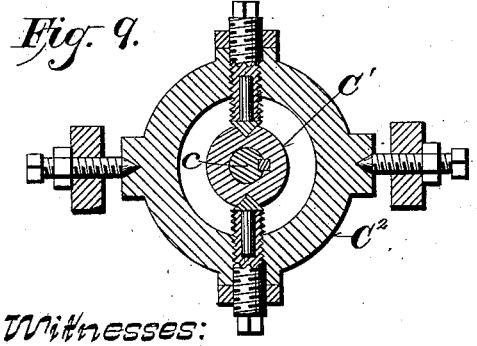
Figure 10:
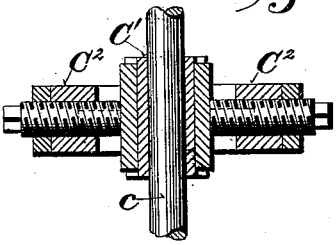
Figure 11:
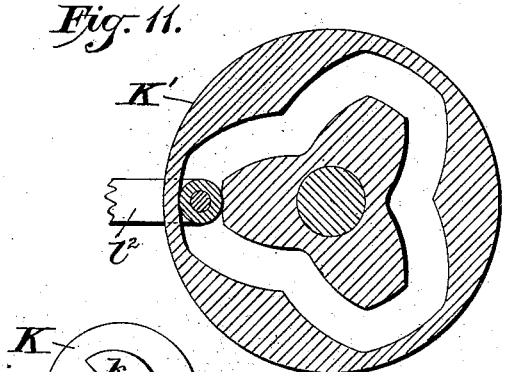
Figure 12:
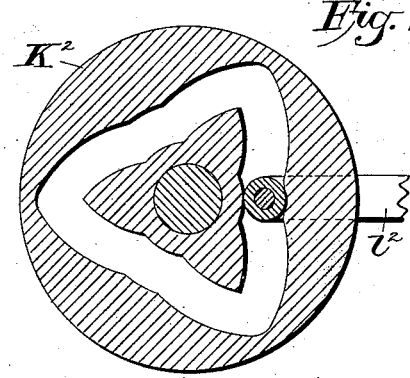
Figure 13:
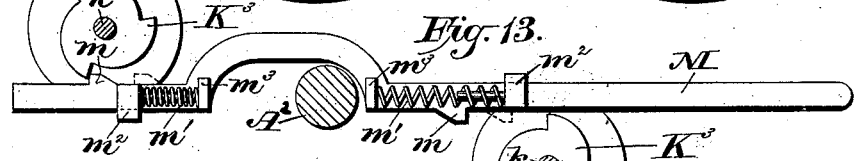
Figure 15:
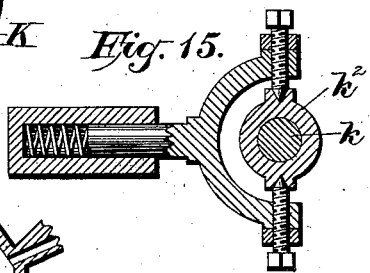
Figure 14:
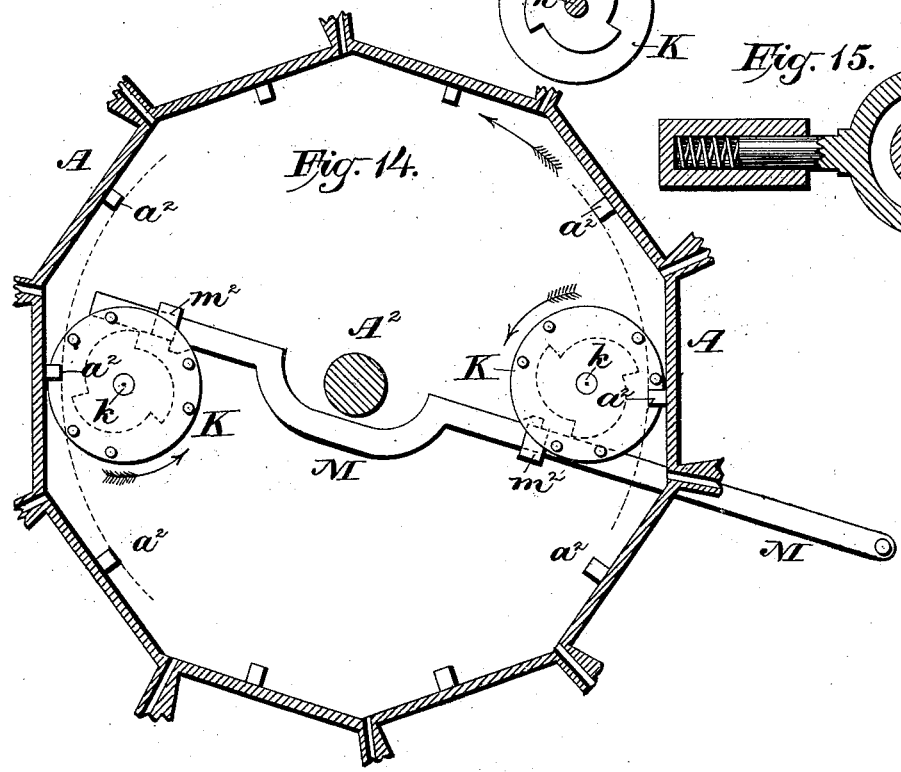

Figure 1 is a plan view of a rotary shingle-machine embodying my improvements. Fig. 2 is a side elevation of the same. Fig. 3 is a vertical axial section of the machine on the broken line $x\, x$, Fig. 1. Fig. 4 is a horizontal section on the line $y\, y$, Fig. 2, showing a plan view of the base of the machine. Figs. 5, 6, 7, and 8 are details, on an enlarged scale, of the cylinder-block with the dog-actuating pistons and the valve mechanism controlling the supply of steam or the like to said cylinders. Figs. 9 and 10 are sectional details, on an enlarged scale, of the adjustable universally-jointed bearing supporting the upper end of the tipping-bars. Figs. 11 and 12 are horizontal sections, on an enlarged scale, of the cams which actuate the valves controlling the tipping-pistons. Figs. 13 and 14 are details illustrating the mechanism for reversing the inclination of the tilting tables; and Figs. 15 to 20, inclusive, are details, on an enlarged scale, of other parts of the machine.

Referring to Figs. 1, 2, 3, and 4, D represents the base of the machine provided with upright posts or columns D', which support at their upper ends a spider-frame A'.

A is a rotary bolt-carrier, consisting of a horizontal annular plate formed with rectangular openings for the reception of the shingle-bolts. It is attached to the spider-frame A', fixed to the upper end of an upright shaft $A^2$, supported and bearing in boxes $A^3$ $A^4$. Each of the bolt-receptacles in the rotary carrier A are provided at their inner ends with fixed dogs F', and at their outer ends with movable dogs F of the usual or any suitable form and construction. The movable dogs F are furnished at the ends with slides working with tongued ways provided for the purpose in said openings. Just below the rotary carrier A is keyed to the shaft $A^2$, so as to rotate therewith, a circular or polygonal cylinder-block E, formed with radial and outwardly-opening cylinders E'. These cylinders are provided with pistons $e$, connected by rods $e'$ with levers $f$, which are fulcrumed to the bolt-carrier A, near its outer periphery, and are connected at their opposite ends with movable dogs F, as shown in Fig. 1.

Figure 7:
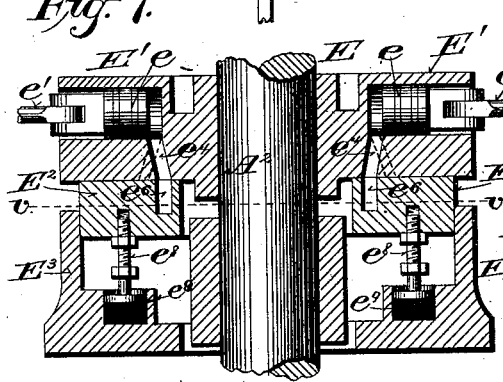

Referring to Figs. 5, 6, 7, and 8, showing, respectively, a horizontal section on the line $v\, v$, Fig. 7, a plan view of the valve-supporting block, a vertical medial section of the cylinder-block, the valve and valve-supporting block, through the eduction ports, and a similar section of the same through the induction-ports.

Figure 5:
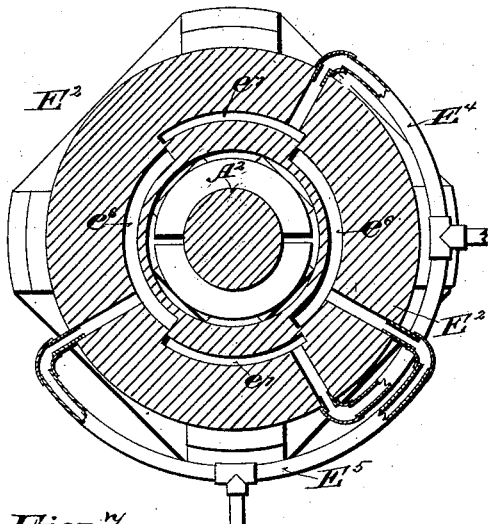
Figure 6:
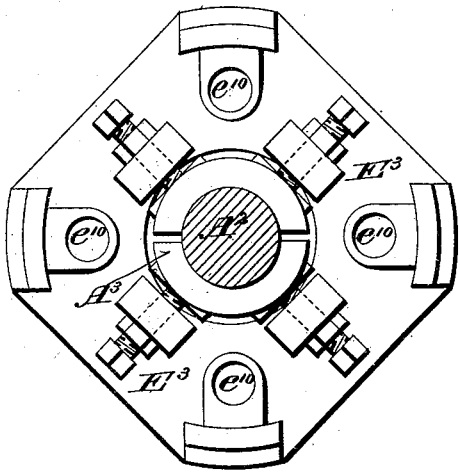

$E^2$ is a valve-block, perforated to receive the shaft $A^2$ and accurately fitted on its upper face to the under face of the cylinder-block E, which turns thereon. It is formed with curved elongated eduction and induction ports $e^6$ and $e^7$ concentric with shaft $A^2$, the eduction-ports $e^6$ alternating with the induction-ports $e^7$ and being in a circle of less diameter than that of which the ports $e^7$ are arcs, as shown in Fig. 5. From the inner end of each of the cylinders E′ two diverging passages $e^4$ and $e^5$ lead to and open at the lower face of the block E, so as to register, respectively, with the eduction and induction ports $e^6$ and $e^7$ in the valve-block E², as shown in Figs. 7 and 8.

E⁴ is a steam-supply pipe connected with a suitable source of steam and by branches with the induction-ports $e^7$ $e^7$, and E⁵ is an exhaust-pipe connected by branches with the eduction-ports $e^6$ $e^6$, as shown in Fig. 5.

E³ is a valve-supporting block attached to the spider-frame D² and formed with sockets $e^{10}$ for the reception of springs or cushions $e^9$ $e^9$, which are made of rubber or other suitable material.

Figure 8:
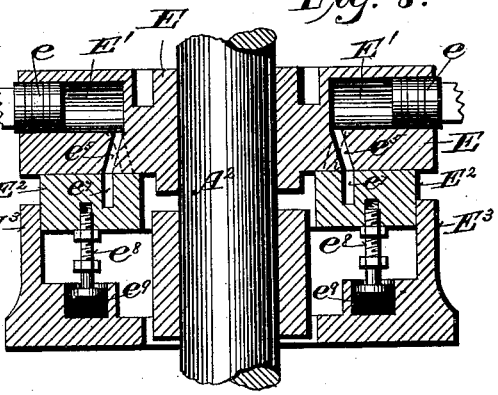

$e^8$ $e^8$ are adjusting-screws, which are provided with broad flat heads inserted in the sockets $e^{10}$ and resting upon the springs or cushions $e^9$, and engage threaded sockets in the under side of the valve-block E², so as to adjust and support the same snugly against the face of the cylinder-block E, as shown in Figs. 7 and 8. The block E³ is centrally perforated to receive the upright shaft A², and carries the adjustable box A³, in which said shaft bears near its upper end, as shown in detail in Fig. 6.

It is obvious that the cylinders E′, instead of being located at the center around the shaft A², may be disposed about the periphery of the bolt-carrier A, and steam-connections made between them and the automatic-valve mechanism at the center. Below the openings in the bolt-carrier A, and a little below the plane of the saws B B, are circular horizontal ways G G, concentric with the shaft A². G′ G′ are movable sections of these circular ways, located just behind each of the saws B B and supported upon standards $g$ $g$, which are attached at their lower ends to rock-shafts $g'$, each of the sections being movable outwardly or away from a line between and parallel with said ways, as shown in Figs. 1, 2, and 4.

H H are vertical cylinders provided with pistons $h$ and piston-rods $h^2$, connected at their upper ends by links with crank-arms $g^2$—one on each of the rock-shafts $g'$, as shown most clearly in Figs. 2 and 4. The piston-rods $h^2$ are extended at their lower ends through the lower heads of cylinders H, and are provided with pistons $h'$, working in cylinders H′, which are located directly underneath the cylinders H, and are provided at each end with small openings, as shown in Fig. 2, so as to admit air and cushion the pistons $h'$.

$h^3$ $h^3$ are sliding valves working in steam-chests applied to the cylinders H and controlling the supply of steam thereto. Their valve-stems are connected with the inner ends of levers $h^4$, fulcrumed to suitable fixed supports on the frame of the machine, and connected at their opposite ends by rods $h^5$ with cam-levers $h^7$, located on opposite sides of the machine adjacent to the outer periphery of the bolt-carrier A and fulcrumed to brackets attached to the frame of the machine, and shown in detail in Figs. 17 and 18.

Figure 18:
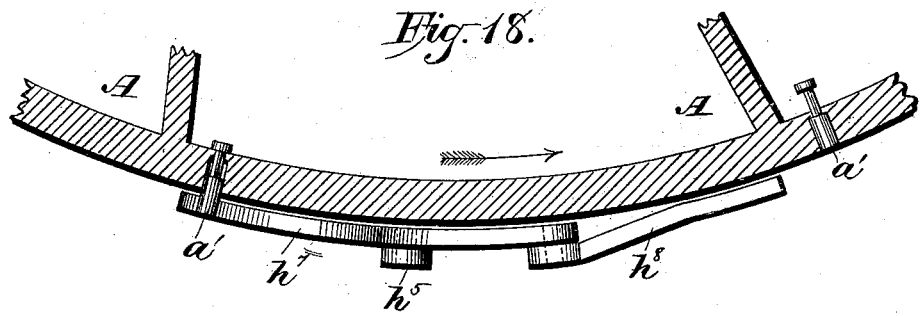

$a'$ $a'$ are sliding pins inserted in horizontal perforations in the outer rim of the bolt-carrier A, adjacent to each of the bolt-receptacles therein, as shown in Fig. 1 and in detail in Fig. 18. These pins are arranged to be projected by the operator outside of the periphery of the bolt-carrier, and when in that position to engage the cam-levers $h^7$, and thereby actuate the valves $h^3$. The brackets to which the cam-levers $h^7$ are fulcrumed are formed or provided with wings $h^8$, inclined inwardly to the periphery of the bolt-carrier, as shown in Fig. 18, and arranged to engage the outwardly-projecting pins $a'$ after they pass the cam-levers $h^7$, and force them inwardly into their normal position flush with the periphery of the bolt-carrier and out of range of said cam-levers $h^7$. The valves $h^3$ are held normally in their lower positions, as seen in Fig. 2, by springs $h^6$, connected with levers $h^4$.

Figure 19:
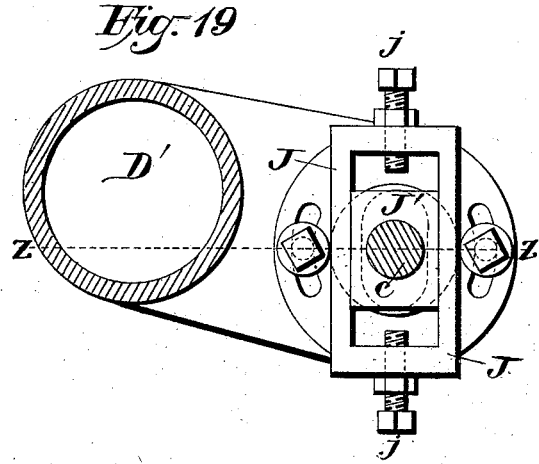
Figure 20:
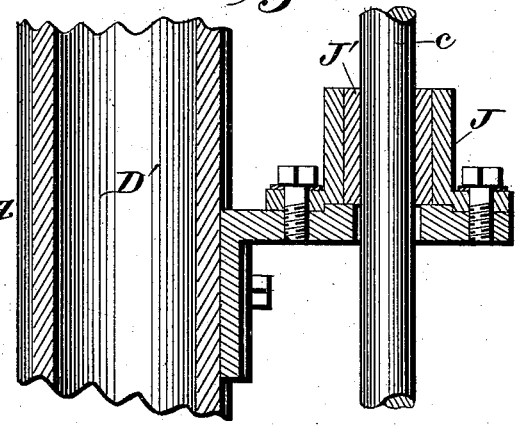

C C are tilting tables located one in front of each of the saws B B and carrying sections of the circular ways G G. The tilting tables are fixed to the upper ends of tipping-bars $c$ $c$, which are supported at their upper ends in adjustable universally-jointed connections with the frame of the machine, and at their lower ends in steps I′, pivoted in the horizontal adjusting-levers I, as shown in Fig. 3. The tipping-bars $c$ $c$ are each provided near their upper ends with sleeves C′, keyed thereon and formed in their opposite sides with vertical V-grooves, which work with V-shaped bearings swiveled in adjusting-screws in the opposite sides of the circular yokes C². (Shown in detail in Figs. 9 and 10.) These yokes C² are supported on opposite sides at right angles to said adjusting-screws between cone-pointed screws held in projections on the frame of the machine. These bearings permit of the free vertical movement of the tilting tables and their lateral adjustment in either direction, and also of a universal angular movement of the tipping-bars $c$. A little above the steps I′ the tipping-bars $c$ pass through slides J′, which are movable horizontally in boxes J, adjustably attached to brackets projecting from the adjacent supporting-columns D′. The movement of said slides in said boxes is limited by adjusting-screws $j$ $j$, and the boxes, as shown in Figs. 19 and 20, are capable of angular adjustment, so as to change the plane of the angular movement of the tipping-bars $c$. The adjusting-levers I are fulcrumed at their inner ends to plates I², pivoted upon pins $i'$, as shown in Fig. 3, to the base of the machine, and capable of angular adjustment corresponding with the adjustment of the boxes J.

$i$ $i$ are adjusting-screws working in nuts in the outer ends of the levers I, and bearing against their supporting-plates I², so as to raise and lower the tilting tables C, as desired.

L L are cylinders supported upon the inner ends of the plates I² and adjustable therewith. They are each provided with a piston $l$, connected by a piston-rod with the lower end of the adjacent tipping-bar $c$, as shown in Fig. 3. Each of these cylinders is provided with a steam-chest connected with a suitable steam-generator and with a valve $l'$, working therewith.

Figure 16:
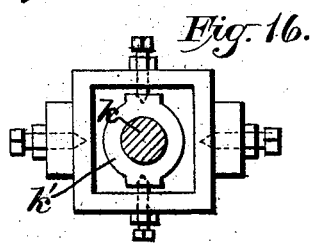
Figure 17:
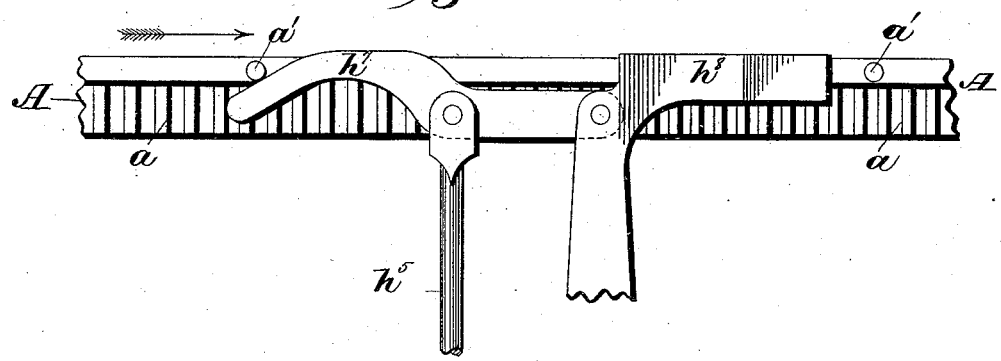

$k\ k$ are upright shafts, each located between the shaft A² of the bolt-carrier and one of the tilting tables C, and supported at its lower end in a box $k'$, attached by a universally-jointed connection, as shown in detail in Fig. 16, to the base of the machine, and near its upper end in an inwardly-yielding bearing $k^2$, (shown in detail in Fig. 15,) attached to the spider-frame D². These shafts $k\ k$ are each provided with a ratchet-wheel $k^3$ and at the upper end with a disk K, the upper side of which is provided, as shown in Figs. 3 and 14, with three pairs of pins or projections, arranged, when moved by the operator into the proper position, to be engaged by lugs $a^2$ on the under side of the bolt-carrier A when it is near its inner periphery. (Shown in Fig. 14.) One of the shafts $k$ is provided with a cam K', and the other with a cam K², (shown in detail in Figs. 11 and 12,) and working with projections on the valve-stems $l^2$ of the valves $l'$. The cam K' is constructed to hold one valve $l'$ normally in its outer position, and the other cam K² is constructed to hold the other valve $l'$ normally in its inner or the reverse position, so as to maintain the tilting tables C C normally at opposite inclinations with reference to the axis of the bolt-carrier.

Referring to Figs. 13 and 14, M is a sliding bar supported in bearings $m^2\ m^2$ on the frame of the machine and provided with dogs $m\ m$, arranged to work in opposite directions with the ratchet-wheels K³. It is held normally in its middle position by springs $m'$, bearing at their ends against lugs $m^3$ on said bar, and the fixed bearings $m^2$, as shown in Fig. 13, which represents the reverse or under side of the device. The bar M is extended to project at the front side of the machine, and is provided with a handle accessible to the operator, as shown in Figs. 1 and 2.

The saws B B, located on opposite sides of the machine, are mounted upon the upper ends of arbors B', which are provided with pulleys B² B², to be connected by belts with any suitable source of power in the usual manner. One of the saw-arbors B' is provided with a pulley $n$, which is connected by a belt with a larger pulley N on the upright counter-shaft $n'$, provided with a smaller pulley $n^2$, which is connected by a belt with a larger pulley O on the upright shaft $o$ at one side of the machine, as shown in Figs. 1, 2, 3, and 4. To the upper end of the shaft $o$ is fixed a pinion, $o'$, which works with the rack or gear $a$ on the outer periphery of the bolt-carrier A, and rotates the same in the direction indicated by arrows in Figs. 1, 14, 17, and 18.

P is an idle pulley supported by the free end of a vibratory arm $p$, pivoted to the base of the machine and connected by a cord $p'$ with a spring-catch hand-lever P' at the front side of the machine and by a cord $p^2$ with a counter-weight $p^3$, by which said pulley is drawn against and held in engagement with the belt connecting the pulleys $n^2$ and O and motion communicated to the bolt-carrier A. The belt-tightening pulley P is drawn out of engagement with said belt, and the movement of the rotary bolt-carrier A thereby arrested by means of the hand-lever P'.

R R represent chutes arranged to catch and conduct away the dust produced by the saws B B.

My improved machine operates as follows: The saws and the bolt-carrier being rotated in opposite directions, (indicated by arrows in Fig. 1,) shingle-bolts are placed in the openings in said carrier as they are brought in rotation to the front of the machine, and are moved upon the circular ways G G by said carrier to and upon the tilting table C in front of the first saw. At this point steam is admitted through the valve E² to the piston $e$, operating the outer dog F, and the bolt is thereby dogged in place. A shingle is then cut from the under side of the bolt by the saw, and the steam is cut off by the valve E² from the piston operating the dog, and the cylinder in which said piston works is opened to exhaust. The spring $e^2$, acting on the connecting-rod $e'$, now moves the dog F outwardly and releases the bolt, which drops upon the circular ways G G, and is carried thereon by the bolt-carrier A upon the opposite tilting table C, which gives it the proper inclination for sawing a shingle therefrom with the butt at the opposite end of the bolt. The bolt is then dogged, as previously described, and another shingle cut by the second or opposite saw B. The operation thus continues until the bolt is sawed into shingles, two shingles being cut therefrom at each revolution of the bolt-carrier, the butts and points being taken alternately from opposite ends of the bolt. The bolt having been thus reduced to a thin section, the adjacent pin $a'$ is thrust outwardly by the operator, and, engaging with the cam-lever $h^7$ of the first spalt-dropper, raises the valve $h^3$, admits steam below the piston $h$, raises the piston, turns the crank-arms $g^2$ upwardly, spreads the movable track-sections G' apart, and drops the spalt resting thereon. As the pin $a'$ escapes the lever $h^7$, it engages the inclined wing $h^8$, and is returned thereby to its normal position. The spring $h^6$ reverses the valve $h^3$, admitting steam above the piston $h$, which descends and returns the track-sections G' to their first or normal positions. The vacant opening in the spalt-carrier is then supplied with another bolt by the operator and the operation continues, as described, with reference to each compartment of the bolt-carrier, which, as shown, contains ten compartments and produces twenty shingles to each revolution. Whenever it is desired for the purpose of graining the bolt or making the cut as nearly as practicable parallel with the grain of the bolt to cut two or more butts from the same end, the bar M is moved by the operator in the proper direction to engage the proper ratchet-wheel $K^3$ and turn a pair of pins in the disk K on the same shaft into position to be engaged by a lug $a^2$ on the bolt-carrier. The lug $a^2$, engaging the first pin of the pair, turns the shaft $k$ and the cam K' or $K^2$, as the case may be, a part of a revolution sufficient to reverse the valve $l'$ and to admit steam to the opposite end of the cylinder L. The position of the piston $l$ being reversed shifts the inclination of the tilting table C with which it is connected and gives the proper inclination to the shingle-bolt thereon to cut a butt from the same end from which a butt was taken by the next preceding cut of the other saw. The next lug $a^2$ on the bolt-carrier engaging the second pin of the pair mentioned returns the tilting table C in the manner just described to its normal position and carries the pins of said disk out of range of the lugs $a^2$.

The preceding operations may obviously be repeated as many times as are necessary to accomplish the desired object.

Various modifications may obviously be made in the construction and arrangement of the several parts and connections constituting my improvements without change in their mode of operation or departure from the spirit of my invention.

It is obvious that in place of steam, compressed air or any other suitable medium may be employed to operate the several pistons herein described.

I claim—

1. In a shingle-sawing machine, the combination, with a saw and a shingle-bolt carrier provided with dogs for holding said shingle-bolts when operated upon by the saw, of a cylinder, a piston working therein and connected with one of said dogs, and an automatic valve controlling the action of said piston and operated by the movement of said shingle-bolt carrier, substantially as and for the purposes set forth.

2. In a shingle-sawing machine, the combination of a saw and a rotary carrier having shingle-bolt receptacles provided with dogs, cylinders movable with said carrier, pistons working in said cylinders and connected one with a dog of each receptacle, and a valve controlling the admission and eduction of the motive-medium to said cylinders, substantially as and for the purposes set forth.

3. In a shingle-sawing machine, the combination, with a saw and a rotary shingle-bolt carrier provided with dogs, of cylinders movable with said carrier, pistons working in said cylinders and connected one with a dog in each receptacle of said carrier, and a central valve connecting in rotation each of said cylinders with the induction and eduction passages, substantially as and for the purposes set forth.

4. In a shingle-machine, the combination, with a saw and a rotary carrier provided with dogs, of a central cylinder-block provided with cylinders and revoluble with said carrier, and a valve-block concentric therewith, provided with induction and eduction ports arranged to register in rotation with induction and eduction passages in said cylinder-block to each of said cylinders, substantially as and for the purposes set forth.

5. In a shingle-sawing machine, the combination, with a saw and a rotary carrier having shingle-bolt receptacles provided with dogs, of a cylinder-block revoluble concentrically therewith and provided with radiating cylinders, pistons working with said cylinders and connected one with a dog in each receptacle of said carrier, a fixed valve-block provided with alternating concentric induction and eduction ports arranged to register in rotation with passages in said cylinder-block to said cylinders, and supply and exhaust connections communicating, respectively, with said induction and eduction ports, substantially as and for the purposes set forth.

6. In a shingle-sawing machine, the combination, with a saw and a rotary shingle-bolt carrier provided with dogs, of cylinders and a block formed with a valve-face, and passages leading to said cylinders and connected and movable with said carrier, pistons working in said cylinders and each connected with one of said dogs, a valve-block provided with induction and eduction ports arranged to register with the passages leading to said cylinders, and a yielding or elastic support holding said valve-block snugly against the face working therewith, substantially as and for the purposes set forth.

7. In a shingle-sawing machine, the combination of a saw and rotary shingle-bolt carrier provided with dogs, cylinders provided with pistons connected with said dogs, a block revoluble with said carrier and formed with a valve-face and passages connecting it with said cylinders, and a vertically-adjustable valve-block having supply and exhaust connections and ports registering with the passages in said rotary block, substantially as and for the purposes set forth.

8. In a shingle-sawing machine, the combination, with a saw and a rotary shingle-bolt carrier provided with dogs, of cylinders provided with pistons connected with said dogs, a valve-block supported upon adjusting-screws and elastic bearings and provided with ports, and a rotary block working with said valve-block and formed with passages which register with the ports therein and communicate with said cylinders, substantially as and for the purposes set forth.

9. In a shingle-sawing machine, the combination, with one or more saws, of shingle-bolt ways having a movable section, a carrier arranged to move the shingle-bolts thereon, a cylinder, a piston working therein and connected with said movable section, a valve connected with the cylinder, actuating mechanism connected with said valve, and a spur on said carrier arranged to engage and operate said valve-actuating mechanism, substantially as and for the purposes set forth.

10. In a shingle-sawing machine, the combination, with one or more saws, of shingle-bolt supporting-ways having movable sections and a carrier arranged to move said shingle-bolts thereon, two cylinders placed in the same axial line, a piston-rod connected with said movable section and provided with two pistons, one working in each of said cylinders and one acting to cushion the movement of the other, and a valve connected with the cylinder of the actuating-piston, substantially as and for the purposes set forth.

11. In a shingle-sawing machine, the combination, with one or more saws, of openings for the reception of shingle-bolts, curved ways located under said openings and having a movable section, a cylinder, a piston working therein and connected with said movable section, a valve connected with said cylinder, a spring holding said valve in its normal position, actuating mechanism connected with said valve, and pins or spurs connected with said carrier and arranged to be moved separately into range with said valve-actuating mechanism, substantially as and for the purposes set forth.

12. In a shingle-sawing machine, the combination of one or more saws, a rotary carrier having a number of openings for the reception of shingle-bolts, curved ways located below said openings and having sections outwardly movable from a line between and parallel with said ways, rock-shafts provided with standards carrying said sections and with crank-arms, a cylinder, a piston working therein and connected with said crank-arms, a valve in connection with said cylinder, held in its normal position by a spring, a lever fulcrumed to a fixed support adjacent to the periphery of said carrier and connected with said valve, pins or spurs inserted in the rim of said carrier and arranged to be moved separately into range with said lever, and an inclined wing arranged to move said pins after they escape said lever out of range therewith, substantially as and for the purposes set forth.

13. In a shingle-sawing machine, the combination of one or more saws, a rotary carrier having a number of openings for the reception of shingle-bolts, curved ways underneath said openings, having a movable section, mechanism connected with said movable section and arranged to carry the same out of position, so as to drop the bolt or spalt resting thereon, a lever fulcrumed to a fixed support adjacent to said carrier and connected with said mechanism, and a movable pin or spur connected with said carrier and arranged to be moved into range with said lever, substantially as and for the purposes set forth.

14. In a shingle-sawing machine, the combination, with a rotary carrier provided with receptacles for a number of shingle-bolts, of spalt-dropping mechanism, a piston connected therewith and arranged to operate the same, a cylinder in which said piston works, a valve controlling the admission of the actuating medium to said cylinder, and trips applied to said bolt-carrier—one for each of the several bolt-receptacles—and arranged under the control of the operator to shift the valve at the proper time to discharge the spalt from either receptacle in said bolt-carrier, substantially as and for the purposes set forth.

15. In a shingle-sawing machine, the combination, with spalt-dropping mechanism, of an actuating-piston connected therewith and a check-piston attached to the same piston-rod, substantially as and for the purposes set forth.

16. In a shingle-sawing machine, the combination, with the shingle-bolt carrier and spalt-dropping mechanism, of a cylinder, a piston working therein and connected with said spalt-dropping mechanism, a valve controlling the admission of the actuating medium to said cylinder, valve-shifting mechanism, and a retractile trip on said carrier arranged, when moved into position by the operator, to engage and operate said valve-shifting mechanism, substantially as and for the purposes set forth.

17. In a shingle-machine, the combination of a rotary carrier having a number of shingle-bolt-receiving openings, ways underneath said openings, having laterally-movable sections, spalt-dropping mechanism connected with said sections, an actuating-piston connected with said mechanism, a valve controlling the movement of said piston, a lever fulcrumed to a fixed support adjacent to said rotary carrier, and movable spurs connected with said carrier and arranged to be moved separately by the operator into range with said lever, substantially as and for the purposes set forth.

18. In a shingle-machine, the combination of a rotary carrier having a number of shingle-bolt-receiving openings, ways underneath said openings, having laterally-movable sections, spalt-dropping mechanism connected with said sections, an actuating-piston connected with said mechanism, a valve controlling the movement of said piston, valve-actuating mechanism, movable spurs connected with said carrier and arranged to be severally moved by the operator into position to engage and operate said valve-actuating mechanism, and a device for automatically returning said spurs to their normal position, substantially as and for the purposes set forth.

19. In a shingle-sawing machine, the combination, with a rotary bolt-carrier, two saws, and two tilting tables set normally to tilt the bolts alternately in opposite directions, of an actuating-piston connected with one of said tilting tables, a valve controlling the movement of said piston, valve-actuating mechanism arranged to be engaged and operated by said bolt-carrier, and a shifting device under the control of the operator, by which said valve-shifting mechanism is set at will in position to be engaged by said bolt-carrier, substantially as and for the purposes set forth.

20. In a shingle-sawing machine, the combination, with a shingle-bolt carrier and a tilting table, of an actuating-piston connected with said tilting table, a valve controlling the action of said piston, and valve-actuating mechanism arranged to be engaged and operated by said bolt-carrier, substantially as and for the purposes set forth.

21. In a shingle-sawing machine, the combination, with a rotary shingle-bolt carrier and a tilting table, of an actuating-piston connected with said tilting table, a valve controlling the action of said piston, a cam connected with the valve-stem, and pins or projections attached to the cam-shaft and arranged to be engaged by a lug on said rotary carrier, substantially as and for the purposes set forth.

22. In a shingle-sawing machine, the combination, with a rotary shingle-bolt carrier, of a tilting table supported upon the upper end of a tipping-bar, a slide connected with the lower end of said tipping-bar, and a way for said slide capable of angular adjustment, substantially as and for the purposes set forth.

23. In a shingle-sawing machine, the combination, with a rotary shingle-bolt carrier, of a tilting table mounted upon the upper end of a tipping-bar which rests at the lower end in an oscillatory step, a slide connected with the lower end of said tipping-bar, a supporting-way for said slide, capable of angular adjustment, a lever in which said step is pivoted, and a support to which said lever is fulcrumed, capable of angular adjustment, substantially as and for the purposes set forth.

24. In a shingle-sawing machine, the combination, with a rotary shingle-bolt carrier, of a tilting table mounted upon the upper end of a tipping-bar which has a jointed connection at its upper end with the frame of the machine and rests at its lower end in an oscillatory step, a slide connected with the lower end of said tipping-bar, a guideway for said slide, capable of angular adjustment, a lever in which said step is pivoted, a cylinder, a piston working therein and connected with said tipping-bar, and a support carrying said step lever and cylinder, capable of angular adjustment, substantially as and for the purposes set forth.

25. In a shingle-sawing machine, the combination of a rotary bolt-carrier having a circular series of lugs, a tilting table, an actuating-piston connected therewith, a valve controlling the action of said piston, a cam engaging the valve-stem, and a disk on said cam-shaft, provided with pairs of pins or teeth arranged to be engaged by the lugs on said rotary carrier, substantially as and for the purposes set forth.

26. In a shingle-sawing machine, the combination of a rotary bolt-carrier provided with a number of bolt-receptacles and a like number of lugs, two or more tilting tables, actuating-pistons connected therewith, valves controlling the movement of said pistons, valve-actuating cams, disks mounted on the cam-shafts and provided with pairs of pins which are arranged to be engaged singly or in pairs by the lugs on said carrier, and a hand-operated device arranged to turn either of said disks, so as to bring a pair of pins into range of said lugs, substantially as and for the purposes set forth.

27. In a shingle-sawing machine, the combination of a rotary carrier having a number of bolt-receptacles and a like number of lugs, two or more tilting tables alternating with a like number of saws and set normally at opposite inclinations, tipping mechanism connected with said tilting tables, rotary disks connected with said tipping mechanism and provided with pairs of pins which are arranged to be engaged by the lugs on said rotary carrier, and a shifting device arranged to turn either of said disks, so as to bring a pair of pins into range with the lugs on said carrier, substantially as and for the purposes set forth.

28. In a shingle-sawing machine, the combination, with a saw and a rotary carrier having a number of bolt-receptacles each provided with a movable dog, of cylinders, an automatic valve connecting said cylinders in rotation with supply and exhaust, single-acting pistons connected with said dogs and working in said cylinders, and springs connected with said dogs and acting in opposition to said pistons, substantially as and for the purposes set forth.

In testimony that I claim the foregoing as my own I affix my signature in presence of two witnesses.

FRANK CHALLONER.

Witnesses:
WILLIS WHEELER,
J. T. ORCHARD.